United States Patent [19]
Merhav et al.

[11] Patent Number: 5,832,135
[45] Date of Patent: Nov. 3, 1998

[54] FAST METHOD AND APPARATUS FOR FILTERING COMPRESSED IMAGES IN THE DCT DOMAIN

[75] Inventors: Neri Merhav, Haifa, Israel; Vasudev Bhaskaran, Mountain View, Calif.

[73] Assignee: Hewlett-Packard Company, Palo Alto, Calif.

[21] Appl. No.: 612,513

[22] Filed: Mar. 6, 1996

[51] Int. Cl.[6] .............................. G06T 5/10; G06F 17/10
[52] U.S. Cl. .......................... 382/260; 382/265; 382/268; 364/724.12; 364/724.17
[58] Field of Search ..................... 382/265, 260, 382/268, 250, 248, 278; 358/432, 433; 348/403, 420; 364/724.17, 724.12

[56] References Cited

U.S. PATENT DOCUMENTS

| | | | |
|---|---|---|---|
| 5,168,375 | 12/1992 | Reisch et al. | 358/432 |
| 5,708,732 | 1/1998 | Merhav et al. | 382/250 |

OTHER PUBLICATIONS

W.H. Chen and S.C. Fralick, "Image Enhancement Using Cosine Transform Filtering," Image Sci. Math. Symp., Monterey, CA, Nov. 1976.

K.N. Ngan and R.J. Clarke, "Lowpass Filtering in the Cosine Transform Domain," Int. Conf. on Commun., Seattle, WA, pp. 37.7.1–37.7.5, Jun. 1980.

B. Chitpraset and K.R. Rao, "Discrete Cosine Transform Filtering," Signal Processing, vol. 19, pp. 233–245, 1990.

S.A. Martucci, "Symmetric Convolution and Discrete Sine and Cosine Transforms," IEEE Trans. on Signal Processing, vol. SP–42, No. 5, pp. 1038–1051, May 1994.

J.B. Lee and B.G. Lee, "Transform Domain Filtering Based on Pipelining Structure," IEEE Trans. on Signal Processing, vol. SP–40, No. 8, pp. 2061–2064, Aug. 1992.

S.–F. Chang and D.G. Messerschmitt, "Manipulation and Compositing of MC–DCT Compressed Video," IEEE J. Selected Areas in Communications, vol. 13, No. 1, pp. 1–11, Jan. 1995.

A. Neri G. Russo, and P. Talone, "Inter–block Filtering and Down–sampling DCT Domain," Signal Processing: Image Communication, vol. 6, pp. 303–317, 1994.

Y. Arai, T. Agui, and M. Nakajima, "A Fast DCT–SQ Scheme for Images," Trans. of the IEICE, E 71(11):1095, Nov. 1988.

N. Merhav and V. Bhaskaran, "A Transform Domain Approach to Spatial Domain Image Scaling," HPL Technical Report #HPL–94–116, Dec. 1994.

N. Merhav and V. Bhaskaran, "A Fast Algorithm for DCT Domain Inverse Motion Compensation," HPL Technical Report #HPL–95–17, Feb. 1995.

*Primary Examiner*—Scott Rogers

[57] ABSTRACT

A method is described for filtering compressed images represented in the discrete-cosine-transform (DCT) domain. The filter includes three sparse, vertical submatrices which are sparse versions of the vertical filter components (VFCs) of a desired filter function that have been combined in such a way as to eliminate many of the non-zero elements. The filter also includes three sparse, horizontal transpose submatrices, which, like the vertical submatrices, are sparse versions of the horizontal filter components of the filter function. The sparseness of these sparse submatrices yields a significant reduction in the number of computations required to filter the image in the DCT domain. To take advantage of this discovery, the input DCT data blocks are "butterflied" to retain the relationship between the input data blocks and the filtered output data blocks as a function of these sparse submatrices. The sparseness of the vertical and horizontal submatrices reduces the number of computations required to filter the image. The sparseness of the DCT data blocks can also be used to further reduce the number of computations required.

38 Claims, 3 Drawing Sheets

FAST METHOD AND APPARATUS FOR FILTERING COMPRESSED IMAGES IN THE DCT DOMAIN

CROSS REFERENCE TO RELATED APPLICATIONS

The present patent application is related to application Ser. No. 08/611,922 (now U.S. Pat. No. 5,708,732) filed on Mar. 6, 1996 and entitled "Fast DCT Domain Downsampling and inverse Motion Compensation". The entire disclosure of that application is incorporated herein by reference.

BACKGROUND OF THE INVENTION

This invention relates generally to image processing and more particularly to filtering compressed digital video and images in the discrete cosine transform (DCT) domain.

Figure 1:
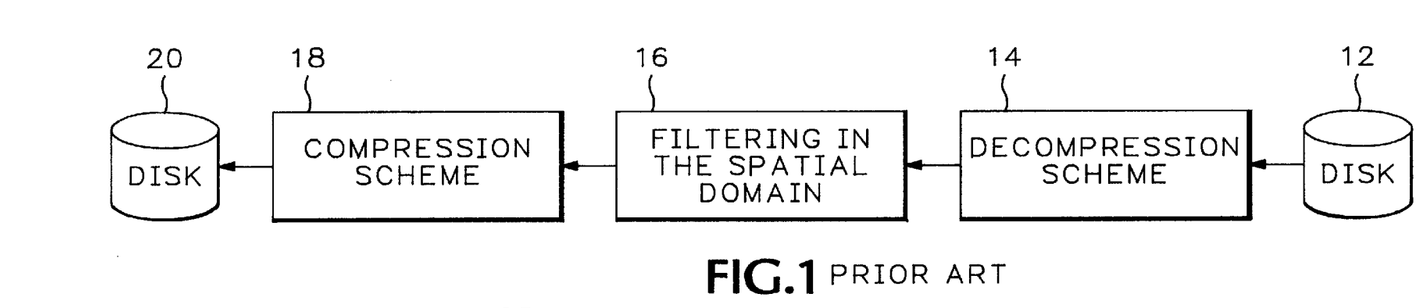
FIG. 1 is a flow chart of a prior art method of filtering image data in the spatial domain.

The conventional approach to filtering images occurs within the so-called spatial domain. A flow chart of this approach is shown in FIG. 1. Initially, an image is stored on a disk 12. The image is stored in a compressed format using one of any number of industry standard compression schemes, for example, JPEG, MPEG, H.261 or H.263, in order to reduce the amount of memory space required to store the image. Many of these compression schemes use the socalled discrete cosine transform (DCT) to convert the original image data from the spatial domain to the compressed domain. The 8×8 2D-DCT transform converts a block $\{x(n,m)\}$ in the spatial domain into a corresponding matrix of frequency components $\{X(k,l)\}$ according to the following equation:

$$X(k, l) = \frac{c(k)}{2} \frac{c(l)}{2} \left[ \sum_{n=0}^{7} \sum_{m=0}^{7} x(n, m) \cos\left(\frac{(2n+1)k\pi}{16}\right) \cos\left(\frac{(2m+1)l\pi}{16}\right) \right] \quad (1)$$

where $c(0) = 1/\sqrt{2}$ and $c(k) = 1$ for $k > 0$.

The conventional approach does not operate on the compressed data. Instead, the image data is transformed from the compressed domain back to the spatial domain in step 14. If the compression scheme uses the DCT, the decompression scheme uses the inverse DCT transform that is given by the following equation:

$$x(n, m) = \sum_{k=0}^{7} \sum_{l=0}^{7} \frac{c(k)}{2} \frac{c(l)}{2} X(k, l) \cos\left(\frac{(2n+1)k\pi}{16}\right) \cos\left(\frac{(2m+1)l\pi}{16}\right) \quad (2)$$

Once the data is returned to the spatial domain, conventional filtering techniques can be used in step 16 to produce a desired filtered image. The filtered data is then compressed again in step 18 using the same compression scheme and stored back to disk 20. Although disks 12 and 20 are shown separately, they can in fact be one and the same.

The problem with this conventional approach is that it is computationally intensive. As described above, the compressed image data must be decompressed, filtered, and then recompressed each time the data is filtered. It is preferable if the filtering can be done in the compressed or DCT domain. In that case, the decompression and compression steps (i.e., 14 and 18) can be eliminated. This approach is only desirable, however, if the filtering in the DCT domain requires fewer operations than the combined number of operations required by the conventional approach.

Past work on DCT domain filtering has largely concentrated on convolution-multiplication properties (CMP's) of the DCT, and by analogy to the well-known CMP of the discrete Fourier transform (DFT). W. H. Chen and S. C. Fralick, in their article entitled "Image Enhancement Using Cosine Transform Filtering," *Image Sci. Math. Symp.*, Monterey, Calif, November 1976, first showed that coefficient-by-coefficient multiplication in the DCT domain corresponds to circular convolution of three time domain (or spatial domain) sequences, one of which is a fixed undesired sequence, that can be eliminated by an appropriate modification of the DCT domain filter coefficients. K. N. Ngan and R. J. Clark in their article entitled "Low pass Filtering in the Cosine Transform Domain," *Int. Conf. on Commun.*, Seattle, Wash. pp. 37.7.1–37.7.5, June 1980, applied this property to low pass filtering of images. Others have simplified significantly the CMP of Chen and Fralick. See B. Chitpraset and K. R. Rao, "Discrete Cosine Transform Filtering," *Signal Processing*, vol. 19, pp. 233–245, 1990. Their method, however, is still applicable only to circular convolution rather than the more desirable linear convolution. Circular convolution, as is known in the art, causes block edge artifacts. More recently, S. A. Martucci has derived a complete set of symmetrical convolution routines for a family of discrete cosine transforms (including the DCT). S. A. Martucci, "Symmetric Convolution and Discrete Sine and Cosine Transforms," *IEEE Trans. on Signal Processing*, vol. SP-42, no. 5, pp. 1038–1051, May 1994. The method shown therein can be modified to obtain a linear convolution approach by appropriate zero padding in the convolution domain. Unfortunately, these approaches cannot be used in many applications since the DCT domain data is already given without prior zero padding in the spatial domain.

As an alternative to the CMP approach, Lee and Lee have used a simple algebraic approach to derive a transform domain linear convolution filter and proposed a pipeline hardware architecture. J. B. Lee and B. G. Lee, "Transform Domain Filtering Based on Pipelining Structure", *IEEE Trans. On-Signal Processing*, vol. SP-40, no. 8, pp. 2061–2064, August 1992. The Lee and Lee approach precomputes the product of the operator matrices corresponding to inverse DCT (IDCT), the convolution, and the DCT, and then uses this combined operator matrix directly in the DCT domain, where the contributions of neighboring DCT data blocks are incorporated similarly as in the overlap and add (OLA) method. Chang and Messerschmitt propose a similar approach by using the distributive property of the DCT with respect to matrix multiplication. S. F. Chang and D. G. Messerschmitt, "Manipulation and Compositing of MC-DCT Compressed Video," *IEEE J. Selected Areas in Communications*, vol. 13, no. 1, pp. 1–11, January 1995. A more thorough study of this approach, in combination with down sampling, has been carried out by Neri et al., "Inter-Block Filtering and Down Sampling in DCT Domain," *Signal Processing: Image Communication*, vol. 6, pp. 303–317, 1994. The problem with each of these approaches is that they are still relatively computationally intensive. As a result, filtering in the DCT domain is slow.

Accordingly, a need remains for a fast method and apparatus for DCT domain filtering.

SUMMARY OF THE INVENTION

It is, therefore, an object of the invention to reduce the number of operations required to filter a compressed image in the DCT domain.

A fast method and apparatus for filtering compressed images in the DCT domain is described herein. The filter according to the invention significantly reduces the computational requirements as compared to the conventional filtering approach in the spatial domain. In fact, the filter according to the invention requires 60–80% fewer computations than the spatial domain method. The filter achieves this result in several ways. First, the filter uses recursion so that some of the computations that are performed in filtering a previous DCT data block are used in the current DCT data block. Second, the filter is tailored to the standard format of 8×8 DCT data blocks. Third, by creating certain butterflies on the input data, the combined linear operator (IDCT-convolution-DCT) can be represented by a relatively sparse matrix. Finally, the typical sparseness of the DCT input data greatly reduces the number of arithmetic operations.

The foregoing and other objects, features and advantages of the invention will become more readily apparent from the following detailed description of a preferred embodiment of the invention which proceeds with reference to the accompanying drawings.

DETAILED DESCRIPTION

Figure 2:
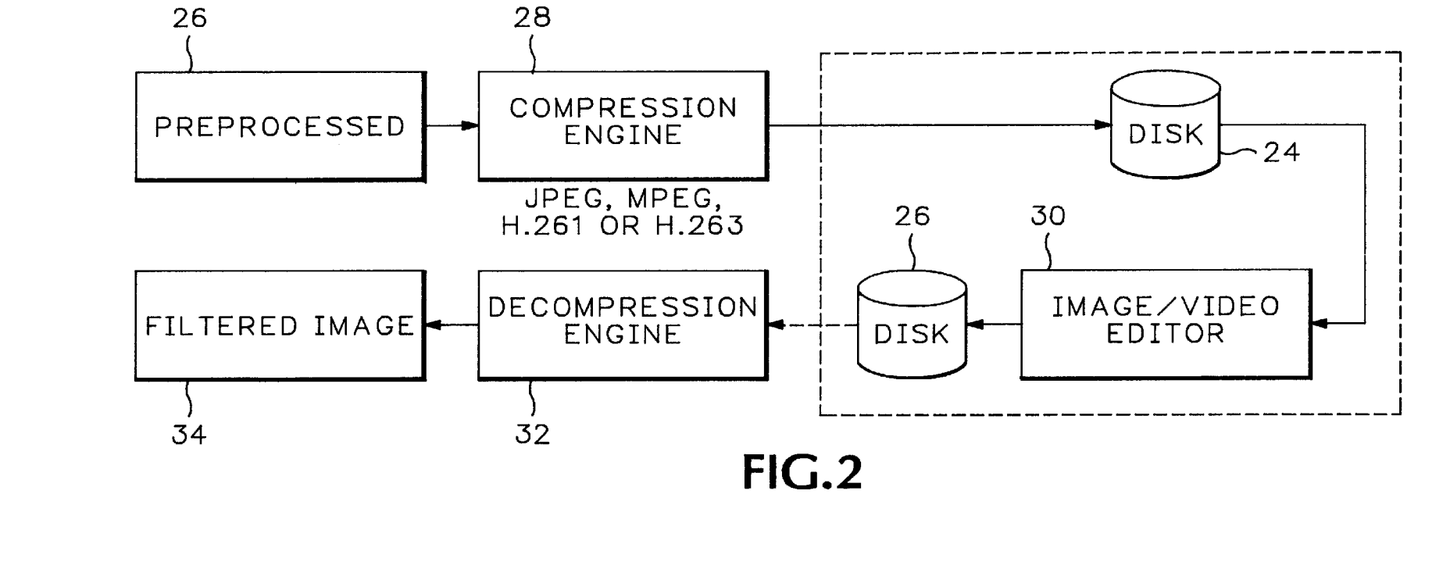
FIG. 2 is a system diagram for an image video editor according to the invention.

Before turning to the details of the filter according to the invention, a proposed system in which the filter resides is shown in FIG. 2. The system includes a disk 24 on which a preprocessed image 26 is stored. The image 26 is compressed by a compression engine 28 according to one of the DCT-based compression schemes (e.g., JPEG, MPEG, H.261 or H.263). The image, for example, could be produced by a photoprocessing shop. The compressed image is then stored on disk 24 to allow the owner of the photograph to edit the photograph using an image/video editor 30. The image video editor 30 includes a filter according to the invention that operates on the compressed image data stored on disk 24 to produce filter image data, which is also in the DCT domain, that is stored on disk 26 after filtering. The image/video editor 30 can include a plurality of predefined filters according to the invention and which allows the user to specify which one or more of these filters are desired. Although disk 26 is shown separately from disk 24, they need only be logically separate. In fact, disk 24 and disk 26 can be the same physical disk.

Once the compressed image has been filtered, the photo-processing shop can then decompress the filtered image with decompression engine 32 to produce a filtered image 34.

Figures 3, 5:
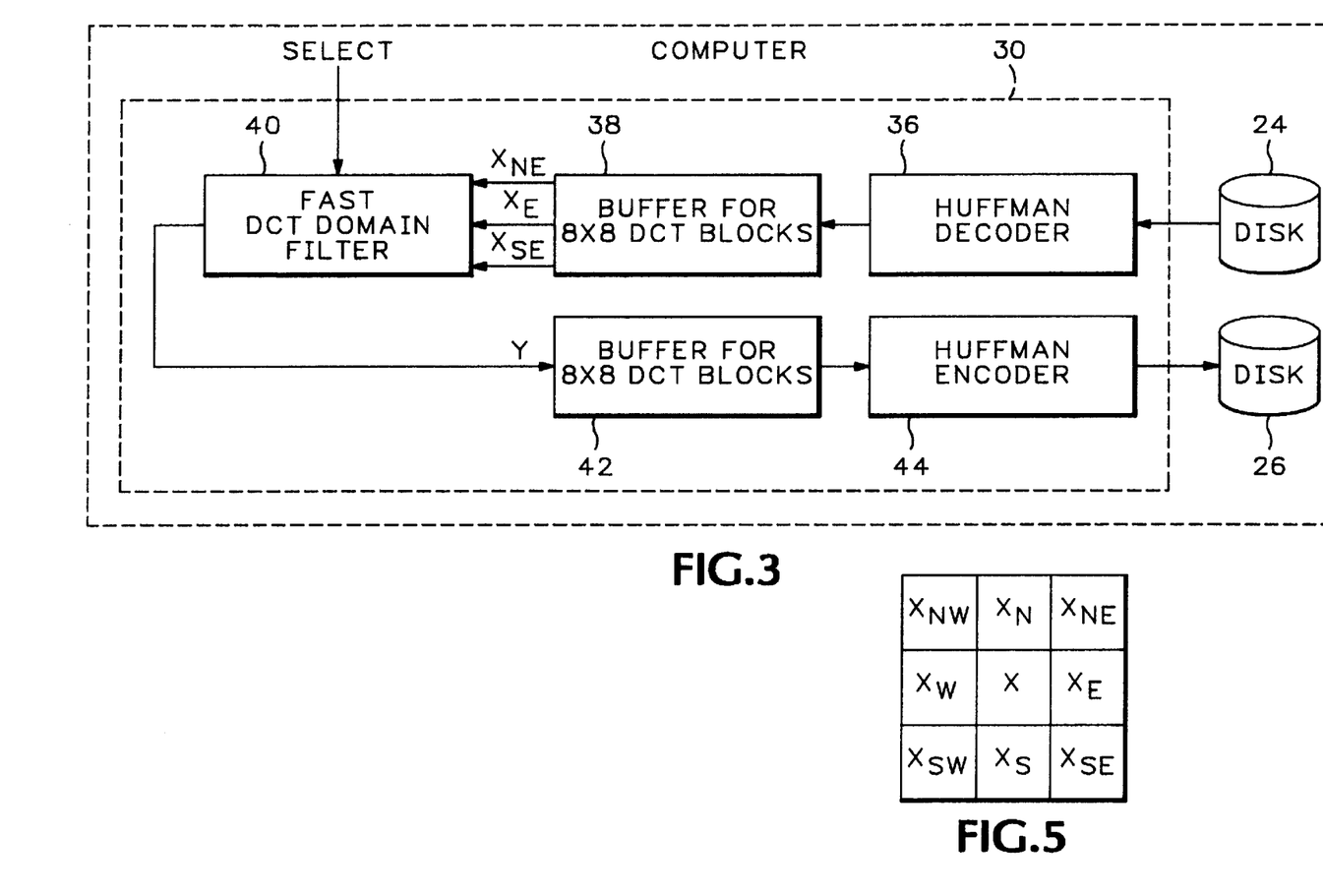
FIG. 3 is a block diagram of the image video editor of FIG. 2.
FIG. 5 is a matrix representation of image data in the DCT domain.

Referring now to FIG. 3, a more detailed block diagram of the image/video editor 30 is shown. The editor includes a Huffman decoder 36 that decodes the data stored on disk 24 using the well-known Huffman decoding technique. The Huffman decoder 36 produces a serial stream of raster data that is buffered by buffer 38 to produce a matrix of DCT blocks such as shown in FIG. 5. Each of the blocks in FIG. 5 (e.g., $X_{NE}$) includes 64 DCT coefficients arranged as an 8×8 matrix. Although the following discussion assumes 8×8 DCT blocks, the invention is not limited thereto.

Three of the DCT blocks ($X_{NE}$, $X_E$ and $X_{SE}$) are provided to a fast DCT domain filter 40 according to the invention. The filter 40 includes three inputs for receiving the three DCT blocks. Filter 40 further includes a fourth input for receiving a SELECT input that is provided by the user. The SELECT input allows the user to select which of the plurality of filter functions the user desires. In the preferred embodiment discussed below, only a single filter function is included in filter 40, which obviates the need for the SELECT input. In other embodiments, however, the select input can be used to select more than one filter function.

The filter 40 produces an output data block Y that is an 8×8 block of filtered DCT data. This output data block Y is provided to a buffer 42, which buffers the output data blocks. Alternatively, the filter 40 can overwrite the contents of buffer 38 thereby eliminating the second buffer 42. For ease of illustration, however, both are shown. The fast method of filtering the DCT data blocks implemented by filter 40 to produce the output DCT data block Y is discussed further below.

The buffer 42 includes an output coupled to a Huffman encoder 44 that re-encodes the filtered output data (Y) using the well-known Huffman encoding technique. The output of the Huffman encoder 44 is then stored back on disk 26. As described above, disks 24 and 26 need not be separate.

The filter 30 can be a dedicated hardware embodiment or, as in the preferred embodiment, a computer program executed by a microprocessor (not shown). In -the preferred embodiment, a computer including a filter program which implements all of the steps described above including fetching, decoding filtering, encoding and storing. One of ordinary skill in the art could write the software required to implement these functions in a high level programming language (e.g., C or C++) based on the description included herein. Accordingly, the program listing itself is omitted.

The derivation of the fast DCT domain filter method is now given below. Referring again to equations 1 and 2 above, in a matrix form, let $$X=\{X(N,M)\}_{n,m=0}^7 \text{ and } X=\{X(k,l)\}_{k,l=0}^7.$$

Define the 8-point DCT matrix $S =\{s(k,n)\}_{k,n=0}^7$, where $$s(k, n) = \frac{c(k)}{2} \cos\left( \frac{2n + 1}{16} \cdot k\pi \right). \tag{3}$$

Then, $$X = S \times S^t \tag{4}$$

where the superscript t denotes matrix transposition. Similarly, let the superscript -t denote transposition of the inverse. Then, $$x = S^{-1} X S^{-t} = S^t X S \tag{5}$$

where the second equality follows from the unitarity of S.

Filtering, or convolution, of an input image $\{I(i,j)\}$, (where i and j are integers taking on values in ranges that correspond to the size of the image), by a filter with impulse response $\{f(i,j)\}$, results in an output image $\{J(i,j)\}$ given by:

$$J(i, j) = \sum_{i'} \sum_{j'} f(i', j') I(i - i', j - j') \tag{6}$$

where the range of summation over i' and j' is, of course, according to the support of the impulse response $\{f(i,j)\}$. In this case, we assume that the filter $\{f(i,j)\}$ is separable, that is, $f(i,j)$ can be factorized as:

$$f(i,j) = v_i h_j, \quad (7)$$

for some one-dimensional sequences $\{v_i\}$ and $\{h_j\}$, and the support of the impulse response is a rectangle. The method, however, is not limited to separable filters. In this case, eq. (6) can be rewritten as:

$$J(i,j) = \sum_{i'} v_{i'} \sum_{j'} h_{j'} I(i-i', j-j'), \quad (8)$$

namely, one can first perform a one-dimensional convolution on each row with the horizontal filter component (HFC) $\{h_j\}$, and then another one-dimensional convolution on each resulting column with the vertical filter component (VFC) $\{v_i\}$. Of course, the order can be interchanged and the vertical convolutions can be carried out first without affecting the final result. An important special case is the one where $v_i = h_i$ for all i, that is, the VFC and the HFC are the same. In this case, the filter is "isotropic" in the sense that rows and columns undergo the same convolution. We will not assume, however, that this property necessarily holds. We next assume that each filter component is symmetric about the origin, that is, $V_i = V_{-i}$ and $h_j = h_{-j}$. The supports of $\{v_i\}$ and $\{h_j\}$ are $|i| \leq M$ and $|j| \leq N$, respectively, meaning that $f(i,j) = 0$ outside a $(2M+1) \times (2N+1)$ rectangle centered at the origin.

The input image $\{I(i,j)\}$ is given in the compressed domain, that is, we are given a sequence of 8×8 matrices $X_1, X_2, \ldots$ of DCT coefficients corresponding to spatial domain 8×8 spatial domain blocks $x_1, x_2, \ldots$ that together form the input image $\{I(i,j)\}$. The filter computes a sequence of 8×8 matrices $Y_1, Y_2, \ldots$ of DCT coefficients of the spatial domain blocks $y_1, y_2, \ldots$ associated with the filtered image $\{J(i,j)\}$, directly from $X_1, X_2, \ldots$ without going via the spatial domain and performing spatial domain convolution.

We further assume that M and N do not exceed 8 (that is, the filter size is always smaller than 17×17, so that every DCT block Y (associated with the spatial domain block y) of the filtered image $\{J(i,j)\}$ depends on the corresponding DCT block X (associated with the spatial domain block x) of the input image $\{I(i, j)\}$ and the eight immediate neighbors of X. We shall label these neighbors according to their relative location with respect to the current block X, i.e., "north," "northeast," "east," etc. Accordingly, the input DCT blocks will be denoted by the appropriate subscript, i.e., $X_N$, $X_{NE}$, $X_e$, and so on. Thus, the input DCT blocks 4 can be expressed as:

$$\begin{array}{ccc} X_{NW} & X_N & X_{NE} \\ X_W & X & X_E \\ X_{SW} & X_S & X_{SE} \end{array}$$

Similarly, the respective spatial domain blocks will be denoted $X_N$, $X_{NE}$, $X_E$, etc.

In summary, the filtering approach according to the invention provides an efficient filtering method that computes Y from X, $X_N$, $X_{NE}$, $X_E$, $X_{SE}$, $X_S$, $X_{SW}$, $X_W$, and $X_{NW}$.

Mathematical Derivation

In the spatial domain, it is convenient to express y, in terms of the nine input blocks and the filter, in the following block matrix form $$y = V \cdot \begin{array}{ccc} X_{NW} & X_N & X_{NE} \\ X_W & X & X_E \\ X_{SW} & X_S & X_{SE} \end{array} \cdot H^t \quad (9)$$

where V is a 8×24 matrix defined as $$V = \quad (10)$$

$$\begin{array}{ccccccccccccc} v_8 & v_7 & \ldots & v_1 & v_0 & v_1 & \ldots & v_7 & v_8 & 0 & \ldots & 0 \\ 0 & v_8 & v_7 & \ldots & v_1 & v_0 & v_1 & \ldots & v_7 & v_8 & 0 & \ldots & 0 \\ \vdots & & & & & & & & & & & & \\ 0 & \ldots & 0 & v_8 & v_7 & \ldots & v_1 & v_0 & v_1 & \ldots & v_7 & v_8 \end{array}$$

and where the high order coefficients are zero if M < 8. Similarly, the matrix H can be represented as:

$$H = \quad (11)$$

$$\begin{array}{ccccccccccccc} h_8 & h_7 & \ldots & h_1 & h_0 & h_1 & \ldots & h_7 & h_8 & 0 & \ldots & 0 \\ 0 & h_8 & h_7 & \ldots & h_1 & h_0 & h_1 & \ldots & h_7 & h_8 & 0 & \ldots & 0 \\ \vdots & & & & & & & & & & & & \\ 0 & \ldots & 0 & h_8 & h_7 & \ldots & h_1 & h_0 & h_1 & \ldots & h_7 & h_8 \end{array}$$

Since the DCT data in eq. (9) is partitioned into 8×8 blocks, it will be convenient to do the same with the matrices H and V, that is, to define $V = [V_1 \, V_2 \, V_3]$ and $H = [H_1 H_2 H_3]$, where $$V_1 = \begin{array}{cccccccc} v_8 & v_7 & v_6 & v_5 & v_4 & v_3 & v_2 & v_1 \\ 0 & v_8 & v_7 & v_6 & v_5 & v_4 & v_3 & v_2 \\ 0 & 0 & v_8 & v_7 & v_6 & v_5 & v_4 & v_3 \\ 0 & 0 & 0 & v_8 & v_7 & v_6 & v_5 & v_4 \\ 0 & 0 & 0 & 0 & v_8 & v_7 & v_6 & v_5 \\ 0 & 0 & 0 & 0 & 0 & v_8 & v_7 & v_6 \\ 0 & 0 & 0 & 0 & 0 & 0 & v_8 & v_7 \\ 0 & 0 & 0 & 0 & 0 & 0 & 0 & v_8 \end{array} \quad (12)$$

$$V_2 = \begin{array}{cccccccc} v_0 & v_1 & v_2 & v_3 & v_4 & v_5 & v_6 & v_7 \\ v_1 & v_0 & v_1 & v_2 & v_3 & v_4 & v_5 & v_6 \\ v_2 & v_1 & v_0 & v_1 & v_2 & v_3 & v_4 & v_5 \\ v_3 & v_2 & v_1 & v_0 & v_1 & v_2 & v_3 & v_4 \\ v_4 & v_3 & v_2 & v_1 & v_0 & v_1 & v_2 & v_3 \\ v_5 & v_4 & v_3 & v_2 & v_1 & v_0 & v_1 & v_2 \\ v_6 & v_5 & v_4 & v_3 & v_2 & v_1 & v_0 & v_1 \\ v_7 & v_6 & v_5 & v_4 & v_3 & v_2 & v_1 & v_0 \end{array} \quad (13)$$

$$V_3 = \begin{array}{cccccccc} v_8 & 0 & 0 & 0 & 0 & 0 & 0 & 0 \\ v_7 & v_8 & 0 & 0 & 0 & 0 & 0 & 0 \\ v_6 & v_7 & v_8 & 0 & 0 & 0 & 0 & 0 \\ v_5 & v_6 & v_7 & v_8 & 0 & 0 & 0 & 0 \\ v_4 & v_5 & v_6 & v_7 & v_8 & 0 & 0 & 0 \\ v_3 & v_4 & v_5 & v_6 & v_7 & v_8 & 0 & 0 \\ v_2 & v_3 & v_4 & v_5 & v_6 & v_7 & v_8 & 0 \\ v_1 & v_2 & v_3 & v_4 & v_5 & v_6 & v_7 & v_8 \end{array} \quad (14)$$

and similar definitions for $H_1$, $H_2$, and $H_3$. We can now rewrite eq. (9) as follows.

$$y = (V_1 x_{NW} + V_2 x_W + V_3 x_{SW})H_1^t + \quad (15)$$
$$(V_1 x_N + V_2 x + V_3 x_S)H_2^t +$$
$$(V_1 x_{NE} + V_2 x_E + V_3 x_{SE})H_3^t$$

Since $S^tS=I$, I being the 8×8 identity matrix, one can insert $S^tS$ between every two multiplied matrices in eq. (15) and then premultiply both sides of the equation by S and postmultiply by $S^t$. This operation takes eq. (15) to the DCT domain, that is, $$Y = (\overline{V}_1 X_{NW} + \overline{V}_2 X_W + \overline{V}_3 X_{SW})\overline{H}_1^t + \quad (16)$$
$$(\overline{V}_1 X_N + \overline{V}_2 X + \overline{V}_3 X_S)\overline{H}_2^t +$$
$$(\overline{V}_1 X_{NE} + \overline{V}_2 X_E + \overline{V}_3 X_{SE})\overline{H}_3^t,$$

where $\overline{V}_i$ and $\overline{H}_i$, i=1, 2, 3, are the DCT's of $V_i$ and $H_i$, respectively. The matrices $\overline{V}_i$ and $\overline{H}_i$, i=1, 2, 3, are referred to herein as submatrices.

While the matrices $\overline{V}_i$ and $\overline{H}_i$, i=1, 2, 3, are not sparse in general, we have discovered that $$V_{++} \triangleq \frac{\overline{V}_1 + \overline{V}_2 + \overline{V}_3}{2} \quad (17)$$

and $$V_{-+} \triangleq \frac{\overline{V}_1 - \overline{V}_2 + \overline{V}_3}{2} \quad (18)$$

never contain more than 20 nonzero elements, and $$V_- \triangleq \frac{\overline{V}_1 - \overline{V}_3}{2} \quad (19)$$

has exactly 32 nonzero elements (with a chessboard structure). The same is true for the submatrices $\overline{H}_1^t$, $\overline{H}_2^t$ and $\overline{H}_3^t$ of the transpose matrix with similar definitions of $H_{++}^t$, $H_{-+}^t$, and $H_-^t$. Thus, the matrices $V_{++}$, $V_{-+}$, and $V_-$ are referred to herein as sparse vertical submatrices and $H_{++}^t$, $H_{-+}^t$, and $H_-^t$ are similarly referred to as sparse horizontal transpose submatrices.

The input data can then be rearranged in such a way by creating so-called "butterflies" that eq. (16) is expressed only in terms of the sparse matrices defined above.

Specifically, let us define $$X_E^{++} = \frac{X_{NE} + X_{SE}}{2} + X_E \quad (20)$$

$$X_E^{+-} = \frac{X_{NE} + X_{SE}}{2} - X_E \quad (21)$$

$$X_E^- = X_{NE} - X_{SE} \quad (22)$$

$$X^{++} = \frac{X_N + X_S}{2} + X \quad (23)$$

$$X^{+-} = \frac{X_N + X_S}{2} - X \quad (24)$$

$$X^- = X_N - X_S \quad (25)$$

$$X_W^{++} = \frac{X_{NW} + X_{SW}}{2} + X_W \quad (26)$$

$$X_W^{+-} = \frac{X_{NW} + X_{SW}}{2} - X_W \quad (27)$$

$$X_W^- = X_{NW} - X_{SW} \quad (28)$$

Now eq. (16) can be written in reduced form as follows:

$$Y = (V_{++} X_W^{++} + V_{-+} X_W^{+-} + V_- X_W^-)H_1^t + \quad (29)$$
$$(V_{++} X^{++} + V_{-+} X^{+-} + V_- X^-)H_2^t +$$
$$(V_{++} X_E^{++} + V_{-+} X_E^{+-} + V_- X_E^-)H_3^t$$

Let us denote $$Z_1 = V_{++} X_W^{++} + V_{-+} X_W^{+-} + V_- X_W^- \quad (30)$$

$$Z_2 = V_{++} X^{++} + V_{-+} X^{+-} + V_- X^- \quad (31)$$

$$Z_3 = V_{++} X_E^{++} + V_{-+} X_E^{+-} + V_- X_E^- \quad (32)$$

If we assume that the blockwise filtering procedure is performed in a raster scan order (i.e., left-to-right and top-to-bottom), then it is easy to note that $Z_2$ is identical to $Z_3$ of the previously processed DCT block, and similarly, $Z_1$ is the same as $Z_3$ two steps ago. Thus, one needs only to calculate $Z_3$ in every step and to save it for the next two steps. Finally, we can rewrite eq. (29) in a further reduced form as follows:

$$Y = Z_1 \overline{H}_1^t + Z_2 \overline{H}_2^t + Z_3 \overline{H}_3^t \quad (33)$$
$$= Z_{++} H_{++}^t + Z_{+-} H_{-+}^t + Z_- H_-^t,$$

where $$Z_{++} = \frac{Z_1 + Z_3}{2} + Z_2 \quad (34)$$

$$Z_{+-} = \frac{Z_1 + Z_3}{2} - Z_2 \quad (35)$$

$$Z_- = Z_1 - Z_3 \quad (36)$$

Comparison between DCT Domain Filtering and Spatial Domain Filtering

The computational requirements of the fast DCT domain filter according to the invention is summarized below. In the parentheses, we provide the number of arithmetic operations associated with each step in the form of an expression $\alpha \cdot m + \beta \cdot a$, which means $\alpha$ multiplications plus $\beta$ additions.

Invention
1. Store the previous value of $Z_2$ in $Z_1$ and the previous $Z_3$ in $Z_2$.
2. Compute $X_E^+ \triangleq (X_{NE} + X_{SE})/2$. (64a)
3. Compute $X_E^{++} = X_E^+ + X_E$. (64a)
4. Compute $X_E^{+-} = X_E^+ - X_E$. (64a)
5. Compute $X_E^-$ according to eq. (22). (64a)
6. Compute $Z_3$ according to eq. (32). (576m+576a)
7. Compute $Z_+ \triangleq (Z_1 + Z_3)/2$. (64a)
8. Compute $Z_{++} = Z_+ + Z_2$. (64a)
9. Compute $Z_{+-} = Z_+ - Z_2$. (64a)
10. Compute $Z_-$ according to eq. (36). (64a)
11. Compute Y according to eq. (33). (576m +576a)

The total number of operations is 1152m+1664a. In many microprocessors, a multiplication costs up to 3 elementary operations (i.e., m=3) whereas an addition amounts to one elementary operation (i.e., a=1). Thus, the total number of operations for one 8×8 output block for DCT domain filtering according to the invention is 5120.

Spatial Domain

Let us compare this result with the total number of computations associated with the straightforward approach of going explicitly via the spatial domain. We assume that the DCT and the IDCT are performed by the fastest known 8-point algorithm due to Arai, Agui, and Nakajima, as described in their article, "A Fast DCT-SQ Scheme for Images," *Trans. of the IEICE*, E 71(11):1095, Nov. 1988, (see also W. B. Pennebaker and J. L. Mitchell, *JPEG Still Image Data Compression Standard*, Van Nostrand Reinhold, 1993), which requires 5 multiplications and 29 additions.

1. Store $X_n$, X, $X_S$, $X_{NE}$, $X_E$, and $X_{SE}$ of the previous step in $X_{NW}$, $X_W$, $X_{SW}$, $X_N$, X, and $X_S$, respectively.
2. Compute the IDCT's $X_{NE}$, $X_E$, and $X_{SE}$. (total:

$$16 \times 3 \times (5m+29a) = 240m + 1392a)$$

3. Compute the vertical convolution using the symmetry of $\{v_i\}$, i.e., $$v_0 x_0^M + \sum_{i=1} v_i(x_i + x_{-i}) \cdot (64(M+1) \cdot m + 128M \cdot a)$$

4. Compute similarly the horizontal convolution.

$$(64(N+1) \cdot m + 128N \cdot a)$$

5. Compute the DCT of the filtered block.

$$(16 \times (5m+29a) = 80m + 464a)$$

Thus, the total number of operations associated with the straightforward approach in the spatial domain is:

$$(64L+448)m + (128L+1856)a \qquad (37)$$

where $L \triangleq M+N$. As before, if we assume m=3 and a=1, the spatial domain approach requires 320L+3584 operations.

Thus, the proposed approach requires 1152×3+1664= 5120 operations while the straightforward approach requires 320L+3584 operations. This means that the proposed approach is preferable for every $L=M+N \geq 5$. In the extreme case L=16, the new approach saves 41% of the computations. It is apparent thus that the DCT domain filtering method according to the invention significantly reduces the number of required computations.

Sparse DCT Domain Input Data

So far our analysis was general in the sense that no assumptions were made on the structure of the DCT input data. It is well known, however, that typically DCT coefficient matrices of real images are very sparse, especially after quantization. This happens because the DCT has the property that most of the energy is concentrated on a relatively small number of coefficients, normally, the ones corresponding to low spatial frequencies.

We shall define a DCT coefficient matrix as sparse if only its 4×4 upper left quadrant (corresponding to low frequencies in both directions) contains nonzero elements. A very high percentage of the DCT blocks usually satisfy this requirement and it is fairly easy to check directly in the compressed format.

If all nine DCT data blocks are sparse, which is a safe assumption, the fast DCT filtering method yields even better results, i.e., requires even fewer computations, as shown below:

1. Store the previous value of $Z_2$ in $Z_1$ and the previous $Z_3$ in $Z_2$.
2. Compute $X_E^+ \triangleq (X_{NE} + X_{SE})/2$. (16a)
3. Compute $X_E^{++} = X_E^+ + X_E$. (16a)
4. Compute $X_E^{+-} = X_E^+ - X_E$. (16a)
5. Compute $X_E^-$ according to eq. (22). (16a)
6. Compute $Z_3$ according to eq. (32). (80m +96a)
7. Compute $Z_+ \triangleq (Z_1 + Z_3)/2$. (32a)
8. Compute $Z_{++} = Z_+ + Z_2$. (32a)
9. Compute $Z_{+-} = Z_+ - Z_2$. (32a)
10. Compute $Z_-$ according to eq. (36). (32a)
11. Compute Y according to eq. (33). (288m+256a)

The total is therefore 368m+544a. Again, if we assume that on a typical microprocessor, e.g., Hewlett-Packard PA-RISC, a multiply costs up to 3 elementary operations (i.e., m=3) and an addition amounts to one elementary operation (i.e., a=1), the total number of elementary operations per output 8×8 block is 1648. Comparing this with the spatial domain approach, which requires 320L+3584 operations, even for the case L=2, approximately 60% of the computations are saved. On the other extreme, for L=16, the saving factor is about 80% over the spatial domain approved.

We have developed a filtering method that efficiently implements spatial domain filtering directly on compressed digital video and images in the discrete cosine transform (DCT) domain. We assumed that the given two-dimensional filter is symmetric in both dimensions and separable, which is normally the case in many applications. It has been demonstrated that the computational complexity of this method is significantly smaller than that of the straightforward approach, of converting back to the uncompressed domain, convolving in the spatial domain, and retransforming to the DCT domain. Specifically, for typically sparse DCT input data 60–80% of the computations are saved depending on the size of the filter. The approach developed here is easy to extend to situations where either M or N or both may exceed the value 8, by taking into account additional neighboring blocks of the input image. A similar derivation can be easily carried out for filters that are anti-symmetric rather than symmetric in one direction or both.

Figure 4:
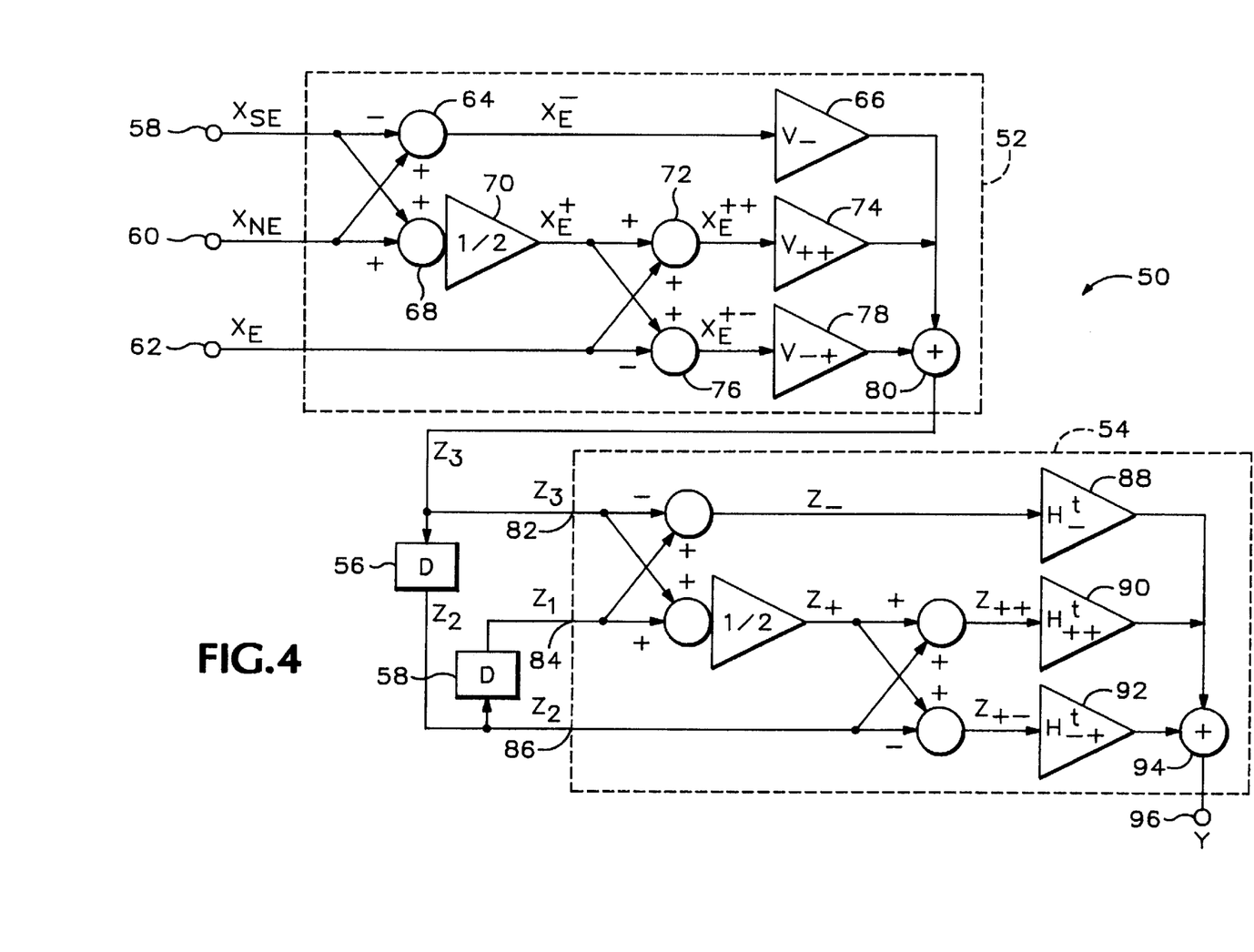
FIG. 4 is a block diagram of a filter according to the invention.

Referring now to FIG. 4, a block diagram of a filter according to the invention is shown generally at 50. The filter 50 implements the filtering method derived above. In fact, the same parameters that are shown in the derivation above are used in FIG. 4. The filter 50 includes four main components: a first computational module 52, a second computational module 54, a first delay memory 56, and a second delay memory 58. As can be seen from FIG. 4, the organization of the two computational modules 52 and 54 is identical. There are, however, three differences: the input data, internal data that is used and the multiplications by the V and H matrices. For instance multiplications by v matrices are performed as premultiplications and multiplications by H matrices are performed as postmultiplications. These differences will become more apparent in a detailed discussion, which follows.

The filter includes three inputs 58, 60 and 62 for receiving three DCT data blocks at $X_{SE}$, $X_{NE}$ and $X_E$, respectively. These three DCT blocks correspond to the right-most column of the matrix shown in FIG. 5. Each of these DCT blocks includes 64 elements organized as an 8×8 matrix.

The computational module 52 includes a first summer circuit 64 that has two inputs and an output. The first of these inputs is coupled to input 58 to receive the DCT data block $X_{SE}$ and the second coupled to input 60 to receive the DCT data block $X_{NE}$. The summer 64 sums the two DCT data blocks on an element-by-element basis to produce a sum matrix $X_E$ that is equal to $X_{NE} - X_{SE}$.

The output of summer 64 is coupled to a first matrix multiplier 66 that multiplies the matrix $X_E$ by a first sparse vertical submatrix $V_-$, which is stored internally in a first vertical matrix memory (not shown). The matrix multiplier 66, as the name implies, multiplies the two matrices ($X_E^- V_-$) according to the known formula for matrix multiplication. The product or result of this matrix multiplication corresponds to the right-most parameter in the equation for Z3 given above.

The computational module 52 also includes a second summing circuit 68 that also includes two inputs. The first input is coupled to input 58 of the filter to receive the DCT data block $X_{SE}$ and the second input is coupled to input 60 of the filter to receive the DCT data block $X_{NE}$. The summing circuit 68 adds these two matrices together in the known fashion to produce a sum $X_{NSE}$ (not shown). This sum is provided to a divider circuit 70, which divides each element in the matrix $X_{NSE}$ by two to produce a resulting matrix $X_E^+$. Because only a divide by two is required, which can be accomplished by a simple "shift" operation, the divider circuit 70 may be substantially reduced from a full divider. In fact, the divide and subsequent add can be accomplished in most compilers by a single "shift and add" operation.

A third summing circuit 72 is included in the computational module 52 that adds together the matrices $X_E^+$ and $X_E$ to produce a sum matrix $X_E^{++}$ that is equal to the sum of these two matrices. The summing circuit 72 is identical to summing circuit 68. The output of summing circuit 72 is coupled to a second matrix multiplier 74. This matrix multiplier 74 is identical in organization to matrix multiplier 66. The matrix multiplier 74, however, includes a second vertical matrix memory for storing a second sparse vertical submatrix $V_{++}$ and which multiplies the second sparse vertical submatrix $V_{++}$ by the matrix $X_E^{++}$ in the known fashion. The result of this matrix multiplication is the first parameter in the expression for $Z_3$ given above.

The computational module 52 finally includes a fourth summing circuit 76 that, like summing circuit 64, 68 and 72, includes two inputs. The first input is coupled to the output of divider circuit 70 in order to receive the matrix $X_E^+$ while the second input is coupled directly to input 62 of the filter to receive the DCT data block $X_E$. The summing circuit 76 sums together $X_E^+$ and $X_E$ to produce a resulting matrix $X_E^{+-}$ that is equal to $X_E^+$ minus $X_E$, on an element-by-element basis. The output of summing circuit 76 coupled to a third matrix multiplier 78. Matrix multiplier 78, as with matrix multipliers 66 and 74, multiplies the input matrix $X_E$ by a third sparse vertical submatrix $V_{-+}$ that is stored in a third vertical matrix memory residing therein. The result of this matrix multiplication is the second parameter ($V_{-+}X_E^+$-) in the expression for $Z_3$ given above.

The outputs of matrix multiplier 66, 74 and 78 are coupled to a summer 80, which sums together the resultant matrices from the three matrix multipliers. The resulting matrix $Z_3$ then has the relationship shown above.

As described above in the derivation, the filter uses recursion in that the partial results (i.e., $Z_3$) of two previous computations are stored. This storage is accomplished by first and second delay memories 56 and 58. The delay memory 56 stores the output produced by computational module 52 from one period ago, while the delay memory 58 stores the results of computational module 52 from two periods ago. A period is the time required to process the current set of input DCT data by the first computational module. The period is determined by the propagation delay through the first computational modules and the time required to properly latch the resulting data in the delay memories. The delay memories 56 and 58 thus allow the filter to be pipelined, as the term is used in the art. It should be noted that the output from one period ago corresponds to a different set of input DCT data blocks than that shown in FIG. 4. In that case, the input data would be the middle column of the matrix shown in FIG. 5 ($X_N$, X, $X_S$). Similarly, the output of the computational module from two periods ago corresponds to the left-most column of the matrix of FIG. 5 is input (i.e., $X_{NW}$, $X_w$, $X_{sw}$).

The filter 50 also includes a second computational module 54, which is identical in organization to the first computational module 52. The module 54 includes three inputs 82, 84 and 86. The first input 82 is coupled to the output of the summer 80 to receive the matrix $Z_3$. The second input 84 is coupled to an output of delay memory 58 to receive the matrix $Z_1$, which is $Z_3$ delayed by two periods. The third input 86 is coupled to the output of delay memory 56 to receive matrix $Z_2$, which is $Z_3$ delayed by only a single period.

The organization of computational module 54 is identical to that of 52 and is therefore not described further. The only difference between the two are the contents of the matrix memories into three matrix multipliers 88, 90 and 92. Matrix multiplier 88 includes a matrix memory that stores the first sparse horizontal submatrix Ht, whose elements can be described by a similar expression as that given above for the first sparse vertical submatrice ($V_-$). The matrix multiplier 90 similarly includes a matrix memory for storing a second sparse horizontal submatrice $H_{++}^t$, which again is described by a similar equation as that for the corresponding vertical sparse submatrice. Finally, matrix multiplier 92 includes a matrix memory for storing a third sparse horizontal submatrice $H_{-+}^t$. These three matrix multipliers 88, 90 and 92 produce the three parameters of the output data block Y shown in the expression above. These products are summed together by a summer 94 and provided to a filter output 96 as an output data block Y, which is the filtered output data. This result can then be stored back to disk in either a separate memory location or can overwrite the current DC data block (X).

The filter 50 assumes a single set of vertical and horizontal filter components. These components are stored, after being combined according to the invention in the matrix memories of the various matrix multipliers. If more than one filter is desired, such as in the system shown in FIG. 3, each matrix multiplier could include a plurality of matrix memories for storing a corresponding plurality of sparse submatrices. The set of sparse matrices could then be selected by the user depending upon the desired filter characteristics.

There are several advantages to the filter approach shown and described herein. The first is that the vertical and horizontal sparse matrices, as defined herein, include a multiplicity of known zero values. Because the location of these zero values are known in advance, the matrix multipliers (66, 74, 78, 88, 90 and 92) need not multiply those elements by the respective multiplicant. This produces significant savings in the number of computations required to implement the filter. Second, the DCT filter according to the invention takes advantage of the properties of the DCT coefficients. For real images, these DCT coefficient matrices are very sparse, especially after quantization. This is because most of the energy of the images is concentrated on a relatively small number of coefficients, normally the ones corresponding to low spatial frequencies. By operating on only those coefficients known to have sufficient energy, the number of computations can be further reduced. Most of these savings are made in the first computational module, which is operating directly on the DCT data blocks. The input $Z_3$ matrix of the second computational module may have more nonzero elements than their DCT counterparts. As a result, not as much computational savings is achieved in the second computational module.

Another advantage of the filtering method and apparatus described herein is that it uses recursion so that the results of previous computations can be saved (i.e., $Z_3$) and used over again. This produces significant computational savings. The result of $Z_3$ can be calculated once and used in the next two periods. This produces further savings over the conventional approach of filtering an image in the spatial domain. It has been shown above that the filter according to the invention produces 60–80% fewer computations than that required by the conventional approach.

Having described and illustrated the principles of the invention in a preferred embodiment thereof, it should be apparent that the invention can be modified in arrangement and detail without departing from such principles. For example, the filter can be implemented in dedicated hardware as shown in FIG. 4 or, alternatively and preferably, implemented in software executed by a general purpose computer. I claim all modifications and variation coming within the spirit and scope of the following claims.

We claim:

1. A filter for a compressed image represented in a discrete cosine transform (DCT) domain and including a plurality of input DCT data blocks organized as:

$$\begin{matrix} X_{NW} & X_N & X_{NE} \\ X_W & X & X_E \\ X_{SW} & X_S & X_{SE} \end{matrix}$$

the filter comprising:

a first computational module having a first input for receiving $X_{SE}$, a second input for receiving $X_{NE}$, and a third input for receiving $X_E$, the first computational module further including first, second and third vertical matrix memories for storing first ($V_-$), second ($V_{++}$) and third ($V_{-+}$) sparse vertical submatrices, respectively, the first computational module also having an output for providing an output z3 that is a predetermined arithmetic combination of the input DCT blocks $X_{SE}$, $X_{NE}$, and $X_E$ and the sparse vertical submatrices $V_-$, $V_{++}$, and $V_{-+}$;

a first delay memory having an input coupled to the output of the first computational module for receiving the output $Z_3$ and an output for providing a delayed output $Z_2$, which is the output $Z_3$ delayed by a predetermined period;

a second delay memory having an input coupled to the output of the first memory for receiving the delayed output $Z_2$ and an output for providing a delayed output $Z_1$, which is delayed output $Z_2$ delayed by the predetermined period;

a second computational module having a first input coupled to the output of the first computational module for receiving output $Z_3$, a second input coupled to the output of the first memory for receiving delayed output $Z_1$, and a third input for receiving delayed output $Z_2$, the second computational module further including first, second and third horizontal matrix memories for storing first ($H_-^r$), second ($H_{++}^r$) and third ($H_{-+}^r$) sparse horizontal transpose submatrices, respectively, the second computational module also having an output for providing an output Y that is a predetermined arithmetic combination of the outputs $Z_3$, $Z_1$ and $Z_2$, and the sparse horizontal submatrices $H_-^r$, $H_{++}^r$, and $H_{-+}^r$, whereby the output Y is a filtered version of the image represented by the input DCT data blocks according to a desired filtering output.

2. A filter according to claim 1 wherein the first computational module includes:

a first arithmetic circuit having a first input for receiving $X_{SE}$, a second input for receiving $X_{NE}$, and a third input for receiving $X_E$, and having a first output for providing $X_E^-$, a second output for providing $X_E^{++}$, and a third output for providing $X_E^{+-}$;

a first matrix multiplier having a first input coupled to the first vertical matrix memory for receiving the first sparse vertical submatrix $V_-$, a second input coupled to the first output of the first arithmetic circuit and an output for producing the product of $X_E^-$ and $V_-$;

a second matrix multiplier having a first input coupled to the second vertical matrix memory for receiving the second sparse vertical submatrix $V_{++}$, a second input coupled to the second output of the first arithmetic circuit and an output for producing the product of $X_E^{++}$ and $V_{++}$; and a third matrix multiplier having a first input coupled to the third vertical matrix memory for receiving the third sparse vertical submatrix $V_{-+}$, a second input coupled to the third output of the first arithmetic circuit and an output for producing the product of $X_E^{+-}$ and $V_{-+}$; and a summer having a first input coupled to the output of the first matrix multiplier, a second input coupled to the output of the second matrix multiplier, a third input coupled to the output of the third matrix multiplier, and an output for providing a sum $Z_3$ equal to the sum of the outputs of the three matrix multipliers.

3. A filter according to claim 2 wherein the first arithmetic circuit includes:

a first summing circuit having a first input for receiving $X_{SE}$, a second input for receiving $X_{NE}$, and an output coupled to the second input of the first matrix multiplier for producing a sum $X_E^-$ that is equal to $X_{NE}$ minus $X_{SE}$;

a second summing circuit having a first input for receiving $X_{SE}$, a second input for receiving $X_{NE}$, and an output for producing a sum $X_{NSE}$ that is equal to $X_{NE}$ plus $X_{SE}$;

a divider circuit having an input coupled to the output of the second summing circuit for receiving $X_{NSE}$ and an output for providing a result $X_E^+$ that is equal to $X_{NSE}$ divided by two;

a third summing circuit having a first input coupled to the output of the divider circuit for receiving $X_E^+$, a second input for receiving $X_E$, and an output coupled to the second input of the second matrix multiplier for producing a sum $X_E^{++}$ that is equal to $X_E^+$ plus $X_E$; and a fourth summing circuit having a first input for receiving $X_E^+$, a second input for receiving $X_E$, and an output coupled to the second input of the third matrix multiplier for producing a sum $X_E^{+-}$ that is equal to $X_E^+$ minus $X_E$.

4. A filter according to claim 3 wherein the divider circuit and the second summing circuit comprise a shift-and-add circuit.

5. A filter according to claim 1 wherein the second arithmetic circuit includes:

a first arithmetic circuit having a first input coupled to the output of the first computational module for receiving $Z_3$, a second input coupled to the output of the second delay memory for receiving $Z_1$, and a third input coupled to the output of the first delay memory for receiving $Z_2$, and having a first output for providing $Z_-$, a second output for providing $Z_{++}$, and a third output for providing $Z_{+-}$;

a first matrix multiplier having a first input coupled to the first horizontal matrix memory for receiving the first sparse horizontal transpose submatrix $H_-^t$, a second input coupled to the first output of the second arithmetic circuit and an output for producing the product of $Z_-$ and $H_-^t$;

a second matrix multiplier having a first input coupled to the second horizontal matrix memory for receiving the second sparse horizontal transpose submatrix $H_{++}^t$, a second input coupled to the second output of the second arithmetic circuit and an output for producing the product of $Z_{++}$ and $H_{++}^t$; and a third matrix multiplier having a first input coupled to the third horizontal matrix memory for receiving the third sparse horizontal transpose submatrix $H_{-+}^t$, a second input coupled to the third output of the second arithmetic circuit and an output for producing the product of $Z_{+-}$ and $H_{-+}^t$; and a summer having a first input coupled to the output of the first matrix multiplier, a second input coupled to the output of the second matrix multiplier, a third input coupled to the output of the third matrix multiplier, and an output for providing a sum Y equal to the sum of the outputs of the three matrix multipliers.

6. A filter according to claim 5 wherein the second arithmetic circuit includes:

a first summing circuit having a first input for receiving $Z_3$, a second input coupled to the output of the second delay memory for receiving $Z_1$, and an output coupled to the second input of the first matrix multiplier for producing a sum $Z_-$ that is equal to $Z_1$ minus $Z_3$;

a second summing circuit having a first input coupled to the output of the summer for receiving $Z_3$, a second input coupled to the output of the second delay memory for receiving $Z_1$, and an output for producing a sum $Z_{13}$ that is equal to $Z_1$ plus $Z_3$;

a divider circuit having an input coupled to the output of the second summing circuit for receiving $Z_{13}$ and an output for providing a result $Z_+$ that is equal to $Z_{13}$ divided by two;

a third summing circuit having a first input coupled to the output of the divider circuit for receiving $Z_+$, a second input coupled to the output of the first delay memory for receiving $Z_2$, and an output coupled to the second input of the second matrix multiplier for producing a sum $Z_{++}$ that is equal to $Z_+$ plus $Z_2$; and a fourth summing circuit having a first input coupled to the output of the divider circuit for receiving $Z_+$, a second input coupled to the output of the first delay memory for receiving $Z_2$, and an output coupled to the second input of the third matrix multiplier for producing a sum $Z_{+-}$ that is equal to $Z_+$ minus $Z_2$.

7. A filter according to claim 5 wherein the filter can be described by a vertical matrix $\overline{V}$ in the DCT domain wherein $\overline{V}$ can further be represented as:

$$\overline{V} = [\overline{V}_1, \overline{V}_2, \overline{V}_3], \text{ and}$$

and a horizontal matrix $\overline{H}^t$, where $\overline{H}^t$ is the transpose of a horizontal matrix $\overline{H}$, wherein $\overline{H}^t$ can further be represented as:

$$\overline{H}^t = [\overline{H}_1^t, \overline{H}_2^t, \overline{H}_3^t].$$

8. A filter according to claim 7 wherein the first vertical matrix memory includes the first sparse vertical submatrix $V_-$, wherein the first sparse vertical submatrix can be represented as:

$$V_- = \frac{\overline{V}_1 - \overline{V}_3}{2}$$

wherein the second vertical matrix memory includes the second sparse vertical submatrix $V_{++}$, wherein the second sparse vertical submatrix can be represented as:

$$V_{++} = \frac{\overline{V}_1 + \overline{V}_2 + \overline{V}_3}{2},$$

and
wherein the third vertical matrix memory includes the third sparse vertical submatrix $V_{-+}$, wherein the third sparse vertical submatrix can be represented as:

$$V_{-+} = \frac{\overline{V}_1 - \overline{V}_2 + \overline{V}_3}{3}.$$

9. A filter according to claim 8 wherein the first sparse vertical submatrix $V_-$ includes 32 nonzero elements and second and third sparse vertical submatrices $V_{++}$ and $V_{-+}$ each include 20 or fewer nonzero elements.

10. A filter according to claim 7 wherein the first horizontal matrix memory includes the first sparse horizontal transpose submatrix $H_-^t$, wherein the first sparse horizontal transpose submatrix can be represented as:

$$H_-^t = \frac{\overline{H}_1^t - \overline{H}_3^t}{2},$$

wherein the second horizontal matrix memory includes the second sparse horizontal transpose submatrix $H_{++}^t$, wherein the second sparse horizontal transpose submatrix can be represented as:

$$H_{++}^t = \frac{\overline{H}_1^t + \overline{H}_2^t + \overline{H}_3^t}{2},$$

and
wherein the third horizontal matrix memory includes the third sparse horizontal transpose submatrix $H_{-+}^t$, wherein the third sparse horizontal transpose submatrix can be represented as:

$$H_{-+}^t = \frac{\overline{H}_1^t - \overline{H}_2^t + \overline{H}_3^t}{3}.$$

11. A method of filtering a compressed image represented in a discrete cosine transform (DCT) domain and including a plurality of DCT data blocks, the method comprising the steps of:

providing a desired filter represented by a vertical component matrix V of a filter matrix and by a transpose horizontal component matrix $H^t$ of the filter matrix, where $H^t$ is a transpose matrix of a horizontal component matrix H, the filter receiving the DCT data blocks as input data and producing filtered data as output represented by an output block Y in the DCT domain;

partitioning the vertical matrix V into vertical submatrices;

combining the vertical submatrices to form sparse vertical submatrices;

partitioning the transpose matrix $H_t$ into horizontal transpose submatrices;

combining the horizontal transpose submatrices to form sparse horizontal transpose submatrices;

combining the DCT data blocks in a predetermined manner to form butterflied DCT data blocks so that the output block Y is expressed only in terms of the butterflied DCT data blocks, the sparse vertical submatrices, and the sparse horizontal transpose submatrices according to a reduced expression; and combining the butterflied DCT data blocks, the sparse vertical submatrices, and the sparse horizontal transpose submatrices according to the reduced expression to produced the output block Y, wherein the number of operations required to perform this step is less than required to filter the image in the spatial domain.

12. A method of filtering a compressed image according to claim 11 wherein the step of partitioning the vertical matrix V into vertical submatrices includes partitioning the vertical matrix V into three vertical submatrices $V_1$, $V_2$, and $V_3$, where $V = [V_1, V_2, V_3]$.

13. A method of filtering a compressed image according to claim 12 wherein the step of combining the vertical submatrices to form sparse vertical submatrices includes combining the vertical submatrices $V_1$, $V_2$, and $V_3$ to form three sparse vertical submatrices $V_{++}$, $V_{-+}$, and $V_-$, wherein $$V_{++} = \frac{\overline{V}_1 + \overline{V}_2 + \overline{V}_3}{2},$$

$$V_{-+} = \frac{\overline{V}_1 - \overline{V}_2 + \overline{V}_3}{3},$$

and $$V_- = \frac{\overline{V}_1 - \overline{V}_3}{2}.$$

14. A method of filtering a compressed image according to claim 13 wherein the DCT data blocks are organized as follows:

| $X_{NW}$ | $X_N$ | $X_{NE}$ |
|---|---|---|
| $X_W$ | $X$ | $X_E$ |
| $X_{SW}$ | $X_S$ | $X_{SE}$ | wherein the step of combining the DCT data blocks in a predetermined manner to form butterflied DCT data blocks so that the output block Y is expressed only in terms of the butterflied DCT data blocks, the sparse vertical submatrices, and the sparse horizontal transpose submatrices according to a reduced expression includes the steps of:

computing $X_E^-$ according to the following formula:

$$X_E^{31} = X_{NE} - X_{SE},$$

computing $X_E^{++}$ according to the following formula:

$$X_E^{++} = \frac{X_{NE} + X_{SE}}{2} + X_E,$$

and computing $X_E^{+-}$ according to the following formula:

$$X_E^{+-} = \frac{X_{NE} + X_{SE}}{2} - X_E.$$

15. A method of filtering a compressed image according to claim 14 wherein the step of computing $X_E^{++}$ includes the step of computing $X_E^+$ according to the following formula:

$$X_E^+ = \frac{X_{NE} + X_{SE}}{2},$$

and computing $X_E^{++}$ according to the following formula:

$$X_E^{++} = X_E^+ + X_E.$$

16. A method of filtering a compressed image according to claim 15 wherein the step of computing $X_E^{+-}$ includes the step of computing $X_E^+$ according to the following formula:

$$X_E^+ = \frac{X_{NE} + X_{SE}}{2},$$

and computing $X_E^{+-}$ according to the following formula:

$$X_E^{+-} = X_E^+ - X_E.$$

17. A method of filtering a compressed image according to claim 16 wherein the step of partitioning the transpose matrix $H^t$ into horizontal transpose submatrices includes partitioning the transpose matrix $H^t$ into three horizontal transpose submatrices $\overline{H}_1^t$, $\overline{H}_2^t$, and $\overline{H}_3^t$, where $$\overline{H}^t = [\overline{H}_1^t, \overline{H}_2^t, \overline{H}_3^t].$$

18. A method of filtering a compressed image according to claim 17 wherein the step of combining the horizontal transpose submatrices to form sparse horizontal transpose submatrices includes the step of combining the three horizontal transpose submatrices $\overline{H}_1^t$, $\overline{H}_2^t$, and $\overline{H}_3^t$ to form three sparse horizontal transpose submatrices $H_{++}^t$, $H_{-+}^t$ and $H_-^t$, wherein $$H_{-+}^t = \frac{\overline{H}_1^t + \overline{H}_2^t + \overline{H}_3^t}{2},$$

$$H_{-+}^t = \frac{\overline{H}_1^t - H_2^t + \overline{H}_3^t}{3}, \text{ and}$$

$$H_-^t = \frac{\overline{H}_1^t - \overline{H}_3^t}{2}.$$

19. A method of filtering a compressed image according to claim 18 wherein the step of combining the butterflied DCT data blocks, the sparse vertical submatrices, and the sparse horizontal transpose submatrices according to the reduced expression to produced the filtered to data Y includes the step of computing $Z_3$ according to the following formula:

$$Z_3 = V_{++} X_E^{++} + V_{-+} X_E^{+-} + V_- X_E^-.$$

20. A method of filtering a compressed image according to claim 19 wherein the step of combining the butterflied DCT data blocks, the sparse vertical submatrices, and the sparse horizontal transpose submatrices according to the reduced expression to produced the filtered to data Y includes the steps of:

storing $Z_3$ for one period to produce $Z_2$; and storing $Z_2$ for one period to produce $Z_1$.

21. A method of filtering a compressed image according to claim 19 wherein the step of combining the DCT data blocks to form butterflied DCT data blocks so that the output block Y is expressed only in terms of the butterflied DCT data blocks, the sparse vertical submatrices, and the sparse horizontal transpose submatrices according to a reduced expression includes the steps of:

computing $Z_-$ according to the following formula:

$$Z_- = (Z_1 - Z_3),$$

computing $Z_{++}$ according to the following formula:

$$Z_{++} = \frac{Z_1 + Z_3}{2} + Z_2,$$

and
computing $Z_{+-}$ according to the following formula:

$$Z_{+-} = \frac{Z_1 + Z_3}{2} - Z_2.$$

22. A method of filtering a compressed image according to claim 21 wherein the step of computing $Z_{++}$ includes the step of computing $Z_+$ according to the following formula:

$$Z_+ = \frac{Z_1 + Z_3}{2},$$

and
computing $Z_{++}$ according to the following formula:

$$Z_{++} = (Z_+ + Z_2).$$

23. A method of filtering a compressed image according to claim 21 wherein the step of computing $Z_{+-}$ includes the step of computing $Z_+$ according to the following formula:

$$Z_+ = \frac{Z_1 + Z_3}{2},$$

and
computing $Z_{+-}$ according to the following formula:

$$Z_{+-} = (Z_+ - Z_2).$$

24. A method of filtering a compressed image according to claim 21 wherein the step of combining the butterflied DCT data blocks, the sparse vertical submatrices, and the sparse horizontal transpose submatrices according to the reduced expression to produced the filtered to data Y includes the step of combining the butterflied DCT data blocks, the sparse vertical submatrices, and the sparse horizontal transpose submatrices according to the following formula:

$$Y = Z_{++} H_{-+}{}^t + Z_{+-}{}^- H_{-+}{}^t + Z_- H_-{}^t.$$

25. A method of filtering a compressed image according to claim 11 wherein the sparse vertical submatrices include nonzero elements and zero elements and wherein the step of combining the butterflied DCT data blocks, the sparse vertical submatrices, and the sparse horizontal transpose submatrices according to the reduced expression to produced the filtered to data Y includes the step of combining the butterflied DCT data blocks, only the nonzero elements of the sparse vertical submatrices, and the sparse horizontal transpose submatrices.

26. A method of filtering a compressed image according to claim 11 wherein the sparse horizontal transpose submatrices include nonzero elements and zero elements and wherein the step of combining the butterflied DCT data blocks, the sparse vertical submatrices, and the sparse horizontal transpose submatrices according to the reduced expression to produced the filtered to data Y includes the step of combining the butterflied DCT data blocks, sparse vertical submatrices, and only the nonzero elements of the sparse horizontal transpose submatrices.

27. A method of filtering a compressed image according to claim 11 wherein the butterflied DCT data blocks include nonzero elements and zero elements and wherein the step of combining the butterflied DCT data blocks, the sparse vertical submatrices, and the sparse horizontal transpose submatrices according to the reduced expression to produced the filtered to data Y includes the step of combining only the nonzero elements of the butterflied DCT data blocks, sparse vertical submatrices, and the sparse horizontal transpose submatrices.

28. A method of filtering a compressed image according to claim 11 further including the step of storing the sparse vertical submatrices and the sparse horizontal transpose submatrices on a general purpose computer.

29. A method of filtering a compressed image according to claim 28 further wherein the steps of combining the DCT data blocks in a predetermined manner to form butterflied DCT data blocks so that the output block Y is expressed only in terms of the butterflied DCT data blocks and combining the butterflied DCT data blocks, the sparse vertical submatrices, and the sparse horizontal transpose submatrices according to the reduced expression to produced the filtered to data Y includes the steps of executing these steps by the general purpose computer programmed according to the reduced expression.

30. A general purpose computer programmed to filter a spatial domain image that has been compressed and is represented in a discrete cosine transform (DCT) domain, the general purpose computer comprising:

a microprocessor;

a storage device coupled to the storage device;

first ($V_{++}$), second ($V_-$) and third ($V_-$) sparse vertical submatrices stored on the storage device, wherein each of the sparse vertical submatrices include a predetermined number of zero and nonzero elements;

first ($H_{++}{}^t$), second ($H_-{}^t$) and third ($H_-{}^t$) sparse horizontal transpose submatrices stored on the storage device, wherein each of the sparse horizontal transpose submatrices include a predetermined number of zero and nonzero elements;

a compressed image stored on the storage device, the compressed image including a plurality of DCT data blocks organized in columns;

computer software stored on the storage device and executable by the microprocessor, the microprocessor performing the following steps under control of the software:

(a) fetching a first column of DCT data blocks from the storage device, the first column including DCT data blocks $X_1$, $X_2$ and $X_3$; (b) computing $X_{++}$ according to the following formula:

$$X_{++} = \frac{X_1 + X_3}{2} + X_2,$$

(c) computing $X_{+-}$ according to the following formula:

$$X_{+-} = \frac{X_1 + X_3}{2} + X_3,$$

(d) computing $X_-$ according to the following formula:

$$X_- = X_1 - X_3,$$

(e) computing $Z_1$ according to the following formula:

$$Z_3 = V_{++}X_{++} + V_{-+}X_{+-} + V_-X_-,$$

(f) retrieving a variable $Z_2$;
(g) retrieving a variable $Z_1$;
(h) computing $Z_{++}$ according to the following formula:

$$Z_{++} = \frac{Z_1 + Z_3}{2} + Z_2,$$

(i) computing $Z_{+-}$ according to the following formula:

$$Z_{+-} = \frac{Z_1 + Z_3}{2} - Z_3,$$

(j) computing $Z_-$ according to the following formula:

$$Z_- = Z_1 - Z_3,$$

(k) computing Y according to the following formula:

$$Y = H_{++}{}'Z_{++} + H_{-+}{}'Z_{+-} + H_-{}'Z_-,$$

where Y is a filtered version of the spatial domain image represented in the DCT domain, whereby the number of computations required to filter the image in the DCT domain is less than that required to filter the image in the spatial domain.

31. A general purpose computer programmed to filter a spatial domain image that has been compressed and is represented in a discrete cosine transform (DCT) domain according to claim 30, the microprocessor further performing the following steps under control of the software:

(1) computing $X_{30}$ according to the following formula:

$$X_+ = \frac{X_1 + X_3}{2} \ ;$$

and
(m) computing $X_{++}$ according to the following formula:

$$X_{++} = X_+ + X_2.$$

32. A general purpose computer programmed to filter a spatial domain image that has been compressed and is represented in a discrete cosine transform (DCT) domain according to claim 31, the microprocessor further performing the following steps under control of the software:

(n) computing $X_{+-}$ according to the following formula:

$$X_{+-} = X_+ - X_2, \ .$$

33. A general purpose computer programmed to filter a spatial domain image that has been compressed and is represented in a discrete cosine transform (DCT) domain according to claim 32, the microprocessor further performing the following steps under control of the software:

(o) computing $X_+$ by performing a shift-and-add function.

34. A general purpose computer programmed to filter a spatial domain image that has been compressed and is represented in a discrete cosine transform (DCT) domain according to claim 30, the microprocessor further performing the following steps under control of the software:

(p) computing $Z_+$ according to the following formula:

$$Z_+ = \frac{Z_1 + Z_3}{2} \ ;$$

and
(q) computing $Z_{+-}$ according to the following formula:

$$Z_{+-} = Z_+ - Z_3.$$

35. A general purpose computer programmed to filter a spatial domain image that has been compressed and is represented in a discrete cosine transform (DCT) domain according to claim 30, the microprocessor further performing the following steps under control of the software:

(r) in steps (b) through (e), ignoring zero elements in the DCT data blocks $X_1$, $X_2$ and $X_3$ in order to further reduce the number of computations required to filter the image.

36. A general purpose computer programmed to filter a spatial domain image that has been compressed and is represented in a discrete cosine transform (DCT) domain according to claim 30, the microprocessor further performing the following steps under control of the software:

(s) in step (e), ignoring zero elements in the first ($V_{++}$), second ($V_-$) and third ($V_-$) sparse vertical submatrices in order to further reduce the number of computations required to filter the image.

37. A general purpose computer programmed to filter a spatial domain image that has been compressed and is represented in a discrete cosine transform (DCT) domain according to claim 30, the microprocessor further performing the following steps under control of the software:

(t) in step (k), ignoring zero elements in the first ($H_{++}{}'$), second ($H_-{}'$) and third ($H_-{}'$) sparse horizontal transpose submatrices in order to further reduce the number of computations required to filter the image.

38. A general purpose computer programmed to filter a spatial domain image that has been compressed and is represented in a discrete cosine transform (DCT) domain according to claim 30, the microprocessor further performing the following steps under control of the software:

(u) storing $Z_2$ as $Z_1$; and, then
(v) storing $Z_3$ as $Z_2$.

* * * * *